United States Patent [19]

Melland

[11] Patent Number: 4,862,667
[45] Date of Patent: Sep. 5, 1989

[54] METAL STRUCTURAL FASTENER/STIFFENER WITH INTEGRAL PRONGS

[76] Inventor: Robert C. Melland, 4172 S. Olive St., Denver, Colo. 80237

[21] Appl. No.: 157,891

[22] Filed: Feb. 19, 1988

Related U.S. Application Data

[63] Continuation-in-part of Ser. No. 98,398, Sep. 18, 1987, abandoned.

[51] Int. Cl.⁴ .................... E04C 3/292; E04C 3/30
[52] U.S. Cl. ........................... 52/732; 52/727; 52/729; 52/730; 52/735; 52/DIG. 6
[58] Field of Search .............. 52/730, 732, 735, 727, 52/729, 733, DIG. 6, 793, 807, 810, 731

[56] References Cited

U.S. PATENT DOCUMENTS

| | | | |
|---|---|---|---|
| 717,923 | 1/1903 | Rapp | 52/DIG. 6 |
| 1,075,845 | 10/1913 | Mills | |
| 1,140,687 | 5/1915 | Lane | |
| 1,250,588 | 12/1917 | Kahn | 52/336 |
| 1,453,996 | 5/1923 | Riddle | 52/376 |
| 1,475,409 | 11/1923 | Riddle | 52/376 |
| 1,778,337 | 10/1930 | Pratt | 52/731 |
| 1,868,168 | 7/1932 | Hull | 52/376 |
| 1,899,344 | 2/1933 | Macomber | 52/376 |
| 1,946,560 | 2/1934 | Wick | 52/376 |
| 2,076,728 | 4/1937 | Keller | 52/731 |
| 2,082,159 | 6/1937 | Hansen | 52/376 |
| 2,101,378 | 12/1937 | Wiskoff | 52/DIG. 6 |
| 2,178,388 | 10/1939 | Beckman | 52/727 |
| 2,359,205 | 9/1944 | Cowan | 154/45.9 |
| 2,432,622 | 12/1947 | Johnston | 52/373 |
| 3,286,429 | 11/1966 | Ratliff, Jr. | 52/735 |
| 3,363,379 | 1/1968 | Curran | 52/336 |
| 3,416,821 | 12/1968 | Benno | 287/20.92 |
| 3,570,208 | 3/1971 | Nikai et al. | 52/727 |
| 3,605,360 | 9/1971 | Lindal | 52/223 R |
| 3,802,147 | 4/1974 | O'Konski | 52/735 |
| 3,849,963 | 11/1974 | Harmon | 52/729 |
| 3,872,641 | 3/1975 | Falkenberg | 52/618 |
| 3,905,171 | 9/1975 | Cargill et al. | 52/615 |
| 3,914,914 | 10/1975 | Jureit et al. | 52/DIG. 6 |
| 3,938,289 | 2/1976 | Falkenberg | 52/618 |
| 3,967,524 | 7/1976 | Snow et al. | 85/13 |
| 4,086,978 | 5/1978 | Clements | 52/376 |
| 4,159,604 | 7/1979 | Burrell | 52/376 |
| 4,285,173 | 8/1981 | Grearson et al. | 52/336 |
| 4,586,550 | 5/1986 | Kitipornchai | 144/353 |

FOREIGN PATENT DOCUMENTS

| | | | |
|---|---|---|---|
| 1004790 | 4/1954 | Fed. Rep. of Germany | |
| 2042800 | 12/1971 | Fed. Rep. of Germany | 52/729 |
| 573265 | 6/1924 | France | 52/376 |
| 1289703 | 9/1972 | United Kingdom | 52/376 |

Primary Examiner—Michael Safavi
Attorney, Agent, or Firm—Norvell E. Von Behren

[57] ABSTRACT

A one-piece structural member with integral fastener prongs for joining to a separate penetrable plate such as plywood or the like. The structural member is formed with at least one web section and with at least one continuous perpendicular flange section having the fastener prongs formed therein. The continuous flange section with the integral web section permits a large variety of prong sizes, spacings and structural configurations to be obtained thereby producing a large variety of panel and beam stiffness and span lengths. The method disclosed herein permits the construction of novel composite structural panels and beams at a job site using the one-piece structural member which is pressed together with a penetrable plate such as plywood, wood studs or the like by means of a pair of pressure rollers, a press brake or other means. The plate functions as an extended flange in a composite section with the web of the structural member taking the shear stresses and the plate taking most of the bending stresses as well as performing a sheathing function. The plates may be spliced together longitudinally to form shallow long-span stressed skin panels and transversely to develop diaphragm action to resist high wind and seismic loading.

7 Claims, 3 Drawing Sheets

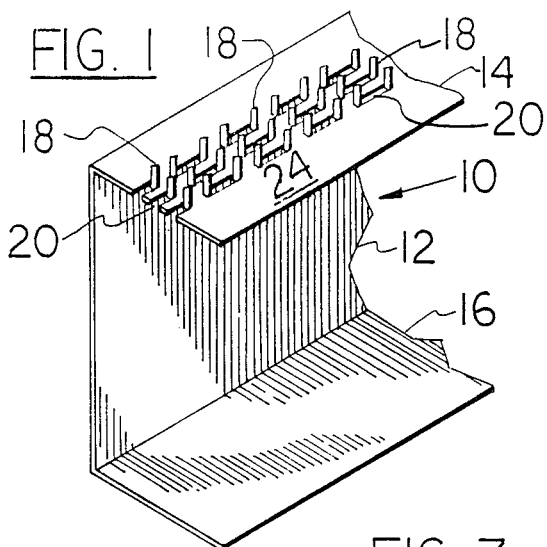
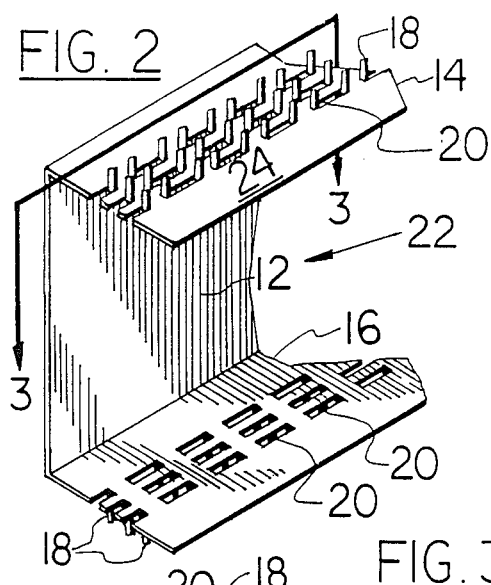
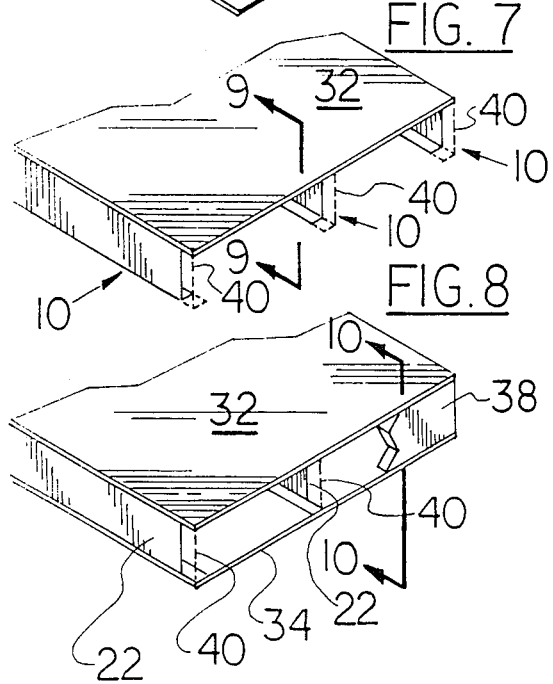
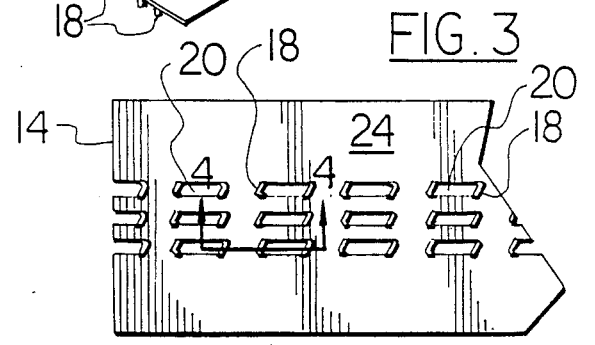
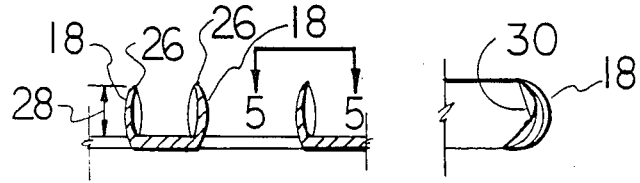
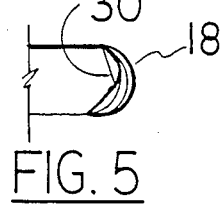
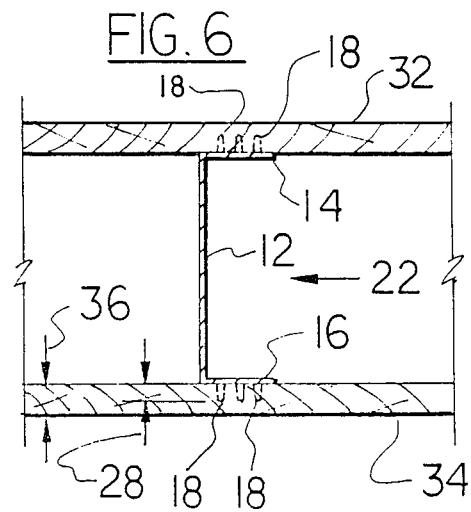
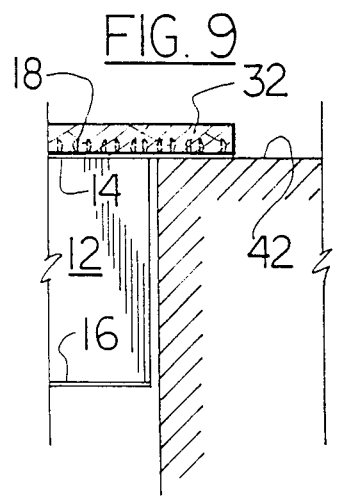
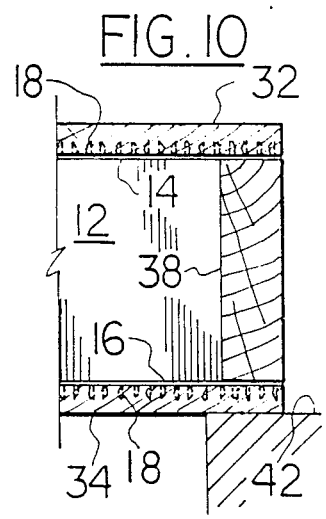

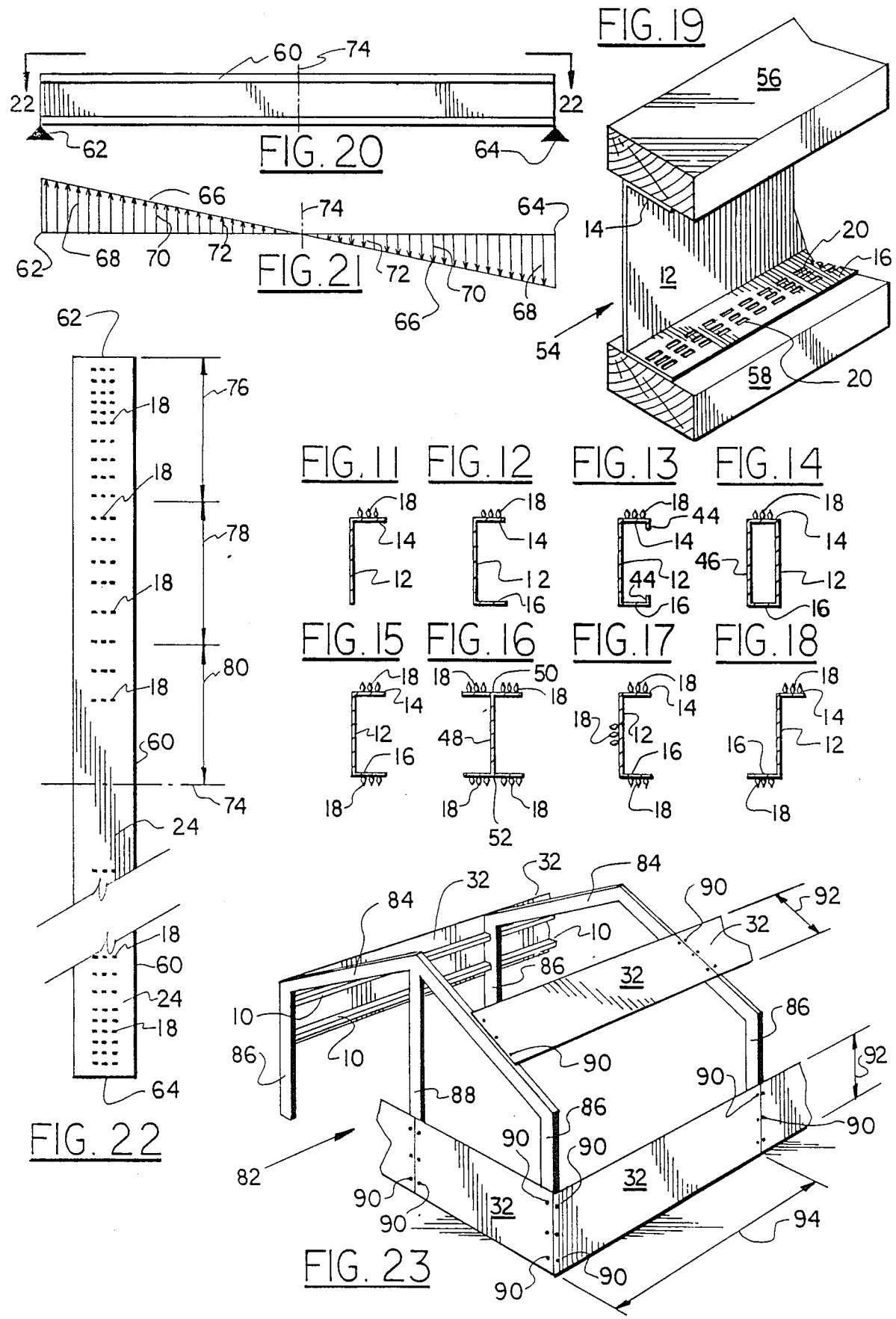

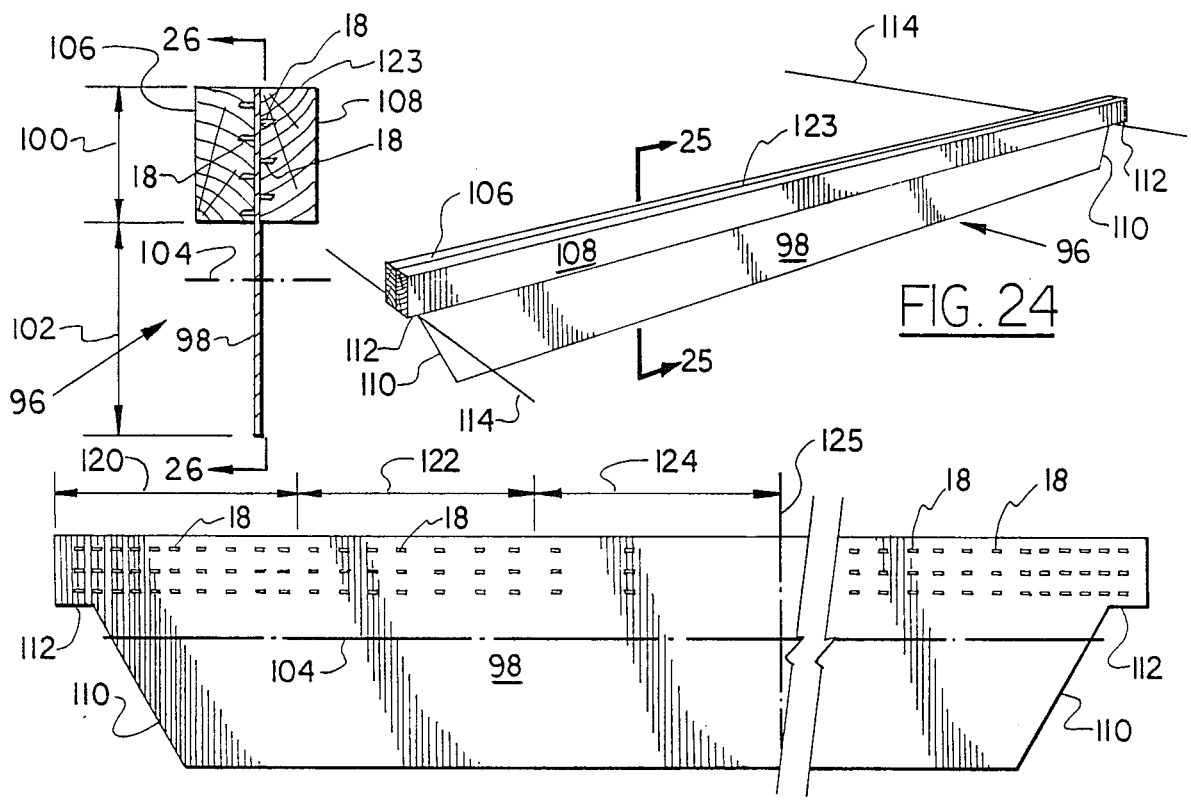
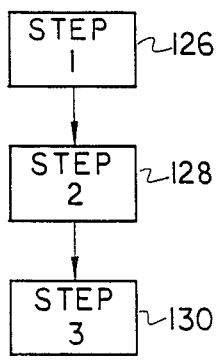
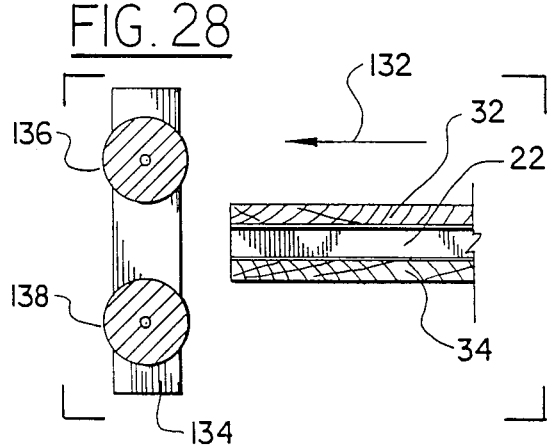
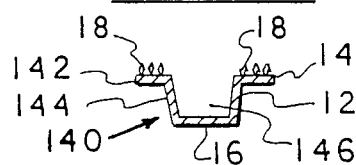

METAL STRUCTURAL FASTENER/STIFFENER WITH INTEGRAL PRONGS

CROSS-REFERENCE TO RELATED APPLICATIONS

This is a continuation-in-part of patent application Ser. No. 098,398, now abandoned filed 09/18/87 by ROBERT C. MELLAND.

BACKGROUND OF THE INVENTION

1. Field of the Invention

This invention relates generally to structural fastener members and particularly to a new and novel fastener member that may be used with a penetrable plate or sheet to facilitate construction at a job site and to provide a much improved composite structural unit when erected in a building or the like.

2. Description of the Related Art

The use of fasteners in the construction of composite structural members such as flat plywood stressed-skin panels is well known in the art. These previously known fasteners typically comprised structural glues to rigidly secure the plywood skins to spaced lumber web members. With this type of construction, both materials (plywood and lumber) were designed to act compositely or in unison due to the glue bond between them.

Since stressed-skin panels were usually relatively shallow, any shear deformation between the skins and the webs contributed materially to vertical deflection. For maximum stiffness, therefore, it was the conventional practice with many of the previously known panel fabricators to glue the plywood skins to the framing members using clamping or other positive mechanical means to ensure good glue bond. In place of mechanical pressure methods, nailing was often used with the nails spaced approximately three to four inches apart along all glued contact areas. Gluing was disadvantageous, however, in that it required special shop-like conditions yto cure properly, and it required additional materials, i.e., the nails, and it was more time consuming to fabricate, and therefore, more expensive in labor costs.

Metallic fasteners with protruding prongs or teeth have also been tried and used with varying degrees of success for joining and fastening various members together. For example in the U.S. Pat. No. 1,140,687, issued May 25, 1915 to V. E. Lane there is taught a fastening device for holding insulation with the device consisting of a series of pointed metallic teeth which penetrate the insulation and which are then bent over at their ends. An insulation block holder for joining insulation blocks to a refrigerator wall using pointed metallic teeth is taught in the U.S. Pat. No. 3,967,524, issued to K. T. Snow et al on July 6, 1976.

A modified type of metallic tooth or prong fastener for use in reinforcing asbestos and other fibrous insulations is taught in the U.S. Pat. No. 2,359,205, issued Sept. 26, 1944 to A. M. Cowan while the same general type fastener has been used to reinforce timber structures as taught in the U.S. Pat. No. 4,586,550, issued to S. Kitipornchai on May 6, 1986.

A multi-pointed metallic fastener for joining wooden joints in building construction is taught in the U.S. Pat. No. 3,416,821, issued to E. L. Benno on Dec. 17, 1968. A multi-pointed plate member has also been utilized to form a structural member as taught in the U.S. Pat. No. 1,075,845, issued to J. H. Mills on Oct. 14, 1913. This device uses inwardly turned pointed tabs on the plate to fasten to internally positioned wooden members to form the structural shape desired.

The use of pointed metallic tabs to form a structural member was also tried in the later invention of H. Hess in 1954 as taught in the German patent No. 1,004,790. This invention uses an elongated metal sheet web which has pointed teeth formed along the lateral edges of the web with the teeth being embedded into oppositely spaced penetrable members and with the entire structure being held together by long bolts.

The Hess basic concept of using pointed teeth on a structural web evolved in later applications as taught in the two U.S. patents issued to J. C. Falkenberg in 1975 and 1976. The first Falkenberg U.S. Pat. No. 3,872,641, issued on Mar. 25, 1975, uses a corrugated web with sharp reverse bend teeth for use in joining oppositely spaced penetrable panels. The second Falkenberg U.S. Pat. No. 3,938,289 issued on Feb. 17, 1976 and was a variation of the earlier design with pointed teeth positioned on the structural web member.

In the U.S. Pat. No. 3,938,289 to Falkenberg it has been proposed that a metal web element containing trapezoidal corrugations with teeth extending outward therefrom serve as a force transferring member in a load bearing beam or panel structure. Such a web, as described, has little practical value in that the corrugations in the web would straighten out longitudinally when subjected to the normal tension stresses that develop in the web when a beam or panel is loaded, thus resulting in excessive deflection. This structure would also require three separate elements to function—a metal web and two opposed plates.

While the later developed web structures with attached pointed teeth, such as the two before mentioned Falkenberg patents may have overcome the disadvantages of gluing and nailing used in earlier structures; there have been introduced in the later structures, other design problems inherent in the particular structure. For example, the U.S. Pat. No. 3,905,171 issued on Sept. 16, 1975 to D. A. Cargill et al uses a metallic web with teeth formed at one or both edges thereof to join opposed penetrable plate members such as plywood. As shown and described therein this concept is unsatisfactory for developing composite action in panel construction because it is substantially lacking in the number of prongs or teeth necessary to resist the normal shearing stresses that would develop in a panel under average loading conditions, thus causing the panel to deflect excessively. In addition, this structure requires at least three separate elements to function—a web and either two opposed plates or one plate with a tension chord member, a detriment similarly found in the Falkenberg device.

Accordingly it is felt that most users of such devices would find it desirable to have a single piece structural fastener formed in various shapes which would require only one other element to function with that element being a penetrable plate such as a plywood sheet or the like. A single piece structural fastener with novel pointed teeth could then be used to reduce fabrication time and materials and could be easily attached to the penetrable plate at the job site for quick erection time.

The novel teeth configuration and tooth spacing used on a single piece structural fastener of the applicant's design would then permit a wide variety of structural shapes to be constructed which would be suitable to overcome the many stress applications in various building structures.

SUMMARY OF THE INVENTION

In order to overcome the before mentioned problems inherent in the various prior art fastener designs, there is provided by the subject invention a new and novel one-piece structural fastener capable of economically, reliably and securely developing composite action between the web and the plate members, regardless of the thickness of the plates. The applicant's new and novel design provides a fastener that facilitates composite panel and beam assembly on site without the need for special shop-like conditions.

The applicant's novel design also provides a fastener that requires no special skill or training to use, with the fastener having improved load carrying capacity over previously known similar beams and panels because of the novel design. The applicat's design with its integral structural shape allows attachment as well as support for nailable panel construction materials and can replace conventional fasteners such as nails and screws without penetrating the panel surface for better appearance and strength.

Because of the applicant's novel design, the fastening prongs can be adjusted in size, number and location on the integral plate member so as to produce a variety of panel and beam stiffnesses and span lengths. In order to accomplish this there is provided in the applicant's novel design a single one-piece structural member formed with at least one elongated web section and with at least one perpendicular flange section. The flange section is formed continuously and not intermittently along the web section thereby permitting a variety of prong spacings and number of prongs to be used which corrects the before mentioned defect in the Cargill design.

The continuously formed flange section has formed thereon a predetermined number of integral fastener prongs protruding from the flange section. The prongs are designed to be engagable with the separate penetrable plate such as plywood or the like used to form the composite unit. By the use of a continuously formed elongated flange integral with the perpendicular web, a variety of prong spacings and prong sizes may be designed to give a variety of composite panel and beam stiffness and span lengths. A much stronger and safer composite structure is thereby obtained and also a much more saleable product may be formed.

Accordingly it is an object and advantage of the invention to provide a single piece integral structural member comprising at least one web section and at least one continuous flange section with the flange section having novel pointed prong fasteners formed therein for engagement with a separate penetrable plate such as plywood or the like.

Another object and advantage is to provide a single piece integral structural member which can be modified by changing the teeth configuration, spacing and size to give varying composite panel and beam stiffness over varying span lengths.

Yet another object and advantage of the invention is to provide a simple but efficient one-piece structural member that may be joined at a construction job site to a separate penetrable panel without requiring elaborate machinery or highly trained personnel.

Still yet another object and advantage of the subject invention is to provide a method for quickly and easily fastening construction materials such as plywood or the like to a novel structural fastener to form a composite structural unit that may be used in building construction and in other construction applications.

A further object and advantage of the subject invention is to provide a structural fastener that is capable of developing composite action between web and plate members and which improves load carrying capacity over previously known similar beams and panels.

Another object and advantage of the subject invention is to provide a fastener whose integral structural shape allows attachment as well as support for nailable panel construction materials and which can replace conventional fasteners such as nails and screws.

Still another object and advantage of the subject invention is to provide a fastener device that is suitable for nailable panel construction materials without penetrating the panel surface for better appearance and strength.

BRIEF DESCRIPTION OF THE DRAWINGS

FIG. 1 is a perspective view of the applicant's novel metal structural fastener.

FIG. 2 is a perspective view of a modified form of the novel fastener shown in FIG. 1.

FIG. 3 is a top plan view, taken along line 3—3 of FIG. 2, showing the fastener prongs of the applicant's invention.

FIG. 4 is a partial cross-sectional view, taken along line 4—4 of FIG. 3, showing in more detail the fastener prongs.

FIG. 5 is a partial top plan view, taken along line 5—5 of FIG. 4, showing the curved configuration of the fastener prongs.

FIG. 6 is a cross-sectional view taken through a typical construction project showing how the applicant's device would be used to form a structural unit.

FIG. 7 is a perspective view of a structural unit showing in more detail how the preferred embodiment fastener of FIG. 1 would be used in a construction project.

FIG. 8 is a perspective view, similar to FIG. 7, showing how the modified form of the fastener of FIG. 2 would be used in a construction project.

FIG. 9 is a cross-sectional view, taken along line 9—9 of FIG. 7 showing how the preferred embodiment of FIG. 7 would be used in a building construction.

FIG. 10 is a cross-sectional view, taken along line 10—10 of FIG. 8 showing how the modified form of the fastener shown in FIG. 8 would be used in a building construction.

FIGS. 11 to 18 show cross-sectional views of various configurations of applicant's novel metal structural fastener that may be constructed.

FIG. 19 is a perspective view of another modified form of the fastener shown in FIG. 2.

FIG. 20 is a typical diagram of a simple beam that would be manufactured out of the applicant's device.

FIG. 21 is a typical stress diagram showing the stresses on the beam of FIG. 20.

FIG. 22 is a top plan view, taken along line 22—22 of FIG. 20 showing how the fastener prongs may be spaced on a typical beam installation.

FIG. 23 is a perspective view of a simple building showing how the applicant's novel fastener would be used in the building construction.

FIG. 24 is a perspective view of another modified form of the applicant's novel fastener used as a fabricated structural beam.

FIG. 25 is a cross-sectional view, taken along line 25—25 of FIG. 24.

FIG. 26 is a cross-sectional view, taken along line 26—26 of FIG. 25.

FIG. 27 is a diagram showing the steps in the method of the applicant's novel invention.

FIG. 28 is a cross-sectional view in diagram form showing how the applicant's fastener would be joined to penetrable members at a job site by pressing the parts together.

FIG. 29 is a cross-sectional view of another configuration of applicant's novel metal structural fastener.

DESCRIPTION OF THE PREFERRED EMBODIMENT

Referring now to the drawings in general and in particular to FIGS. 1 and 2 of the drawings, there is shown a perspective view of the applicant's novel metal structural fastener generally by the numeral 10 and a modified form thereof generally by the numeral 22. The fasteners 10 and 22 are formed of a light gauge sheet metal of a thickness of 12 to 30 gauge (0.0991" to 0.0123"). The fasteners 10 and 22 have a web 12 and a top flange 14 along with a bottom flange 16 integrally formed thereon.

A plurality of sharp fastener prongs 18, which are formed out of elongated slots 20, are integral with, and generally perpendicular to the flanges and are punched therefrom to leave the series of elongated offset holes 20 in the flange 14 and/or 16.

Referring now to FIG. 3 of the drawings there is shown a top plan view, taken along line 3—3 of FIG. 2 and showing the position of the fastener prongs 18. By forming the flanges 14 and 16 with a continuous face 24 then the designer of the applicant's novel structural device is able to provide a large variety of positions for the prongs 18 as well as spacing of the prongs. He is also able to provide a variety of number and length of prongs thereby permitting a large variety of panel and beam stiffnesses and span lengths when the fastener is attached to a penetrable plate such as plywood, wafer board or the like.

Referring now to FIGS. 4 and 5 there is shown in more detail the usual prong configuration in order to attach a penetrable plate to the novel structural fastener. The prongs 18 would be formed with a sharp pointed tip 26 and would have a prong height, shown by the arrow 28, which would be designed to penetrate into the plywood or waferboard. As before mentioned, to improve appearance and strength it would be desirable to design the height 28 of each prong to be somewhat less than the thickness of the plywood penetrable plate so that the prong 18 does not stick out of the exterior surface of the plywood.

It would also be preferable to form the prong 18 in a curved configuration 30 as shown in FIG. 5, thereby increasing the horizontal shear strength of the fastener when formed into a composite structure. Referring now to FIG. 6 there is shown a cross-sectional view taken through a typical construction project and showing how one form of the applicant's novel fastener would be attached to penetrable plates 32 and 34 to form a composite structure. FIG. 6 would represent the novel modified form of the fastener shown generally at 22 and which is also shown in FIG. 2. This form of the fastener uses prongs 18 formed on both the top flange 14 and the bottom flange 16. The composite structure could be pressed together in the field as will be detailed hereinafter. When formed thusly the prongs 18 penetrate into the plywood or waferboard 32 and 34 for a distance 28 somewhat short of the thickness 36 of the penetrable boards.

Turning now to FIGS. 7 and 8 there are shown perspective views of the two forms of the applicant's fasteners shown in FIGS. 1 and 2 respectively. In FIG. 7, the plurality of fasteners 10 would be formed with a portion 40 of the metal web 12 removed. This portion would be shown by the dashed lines 40 and is removed so that the composite unit may be positioned and fixedly attached to a building bearing surface 42 as shown in FIG. 9.

In the FIG. 8 form of the composite panel the modified fastener 22 would also be formed with end portions 40 removed so that a wooden end blocking 38 may be positioned and fixed therein by nails or other means. When formed thusly, the removed end portions would be able to be positioned on the building bearing surfaces 42 as shown in FIG. 10 of the drawings.

Where the end closure blocking 38 is required to resist vertical shear, the wood blocking 38 may be secured to the top penetrable plate 32 and the bottom penetrable plate 34 as shown in FIG. 10 by nails or other fastening means. It is preferred that the support for a two-sided composite panel be bottom bearing as shown in FIG. 10 with the end blocking 38 connecting both penetrable plates together for greater resistance to vertical shear at the bearing support surface 42.

The single-piece structural fastener of FIG. 1 or 2 will provide support and stiffening for a wide variety of constructional elements, including sawn boards, plywood, chipboard, wafer board, wood fiberboard, gypsum board and many others. Users of the applicant's novel fastener will also find it most useful for long-span repetitive applications such as floor, wall and roof panel systems.

Referring now to FIGS. 11–18 of the drawings there are shown cross-sectional views of various configurations of the applicant's novel structural fastener that may be formed with the continuous flanges and plurality of pointed fastener prongs of the type before mentioned. FIG. 11 shows an L-shaped configuration with one web 12 formed integrally with one top flange 14 and a plurality of prongs 18 formed along the continuous top flange. FIG. 12 shows a variation which has already been described when referring to FIG. 1. FIG. 13 is a modification of the FIG. 12 version but contains inturned flange ends 44 on the top flange 14 and the bottom flange 16.

The variation shown in FIG. 14 is a box-like configuration with two webs 12 and 46 integrally formed with two flanges 14 and 16 and with a plurality of fastener prongs 18 formed along the continuous surface of the flange. The variation shown in FIG. 15 has already been described in detail when referring to FIG. 2 of the drawings. In FIG. 16 is shown an I-shaped configuration with a continuous top flange 50 and a continuous bottom flange 52 integrally formed between a central web 48. The top flange 50 and/or bottom flange 52 would have formed thereon the fastener prongs 18 of the type shown and described when referring to FIGS. 3–5.

FIG. 17 shows a variation of the fastener which is similar to the form shown in FIG. 13 but includes a plurality of fastener prongs 18 also being formed along the continuously formed web 12. The variation of FIG. 18 of a Z-shaped configuration with a central web 12 and a continuous top flange 14 and a continuous bottom flange 16 turned in an opposite direction to form the Z-shape. A plurality of fastener prongs 18 may be formed on the continuous flange 14 and/or on the continuous flange 16.

While FIGS. 11-18 show various configurations of the applicant's novel structural fastener, they are only given for illustrative purposes and other forms are possible within the spirit and scope of the invention. For example FIG. 19 shows how one of the applicant's structural fasteners may be used in a composite unit to form a new type structural beam shown generally by the numeral 54. The beam 54 uses the fastener configuration of FIGS. 2 and 15 in combination with a nailable top chord 56 and a nailable bottom chord 58, both of which are formed out of wooden beams such as 2"×4" types or others within the spirit and scope of the invention.

In order to better understand how the applicant's basic structural fastener functions when fixed to a penetrable plate, reference should be made to FIG. 20 of the drawings. There is shown in FIG. 20 a typical diagram of a simple beam 60 that could be manufactured out of the applicant's fastener. The beam 60 would be positioned on the end bearing point 62 and 64 of a building or construction project. Looking now at FIG. 21 there is shown a typical unit stress diagram showing the stresses on the beam 60 caused when said beam is uniformly loaded. Each unit of stress along the beam is shown by the plurality of arrows such as 68, 70 and 72. It can be seen that the maximum stress on the beam 60 would be at the end bearing points 62 and 64 while the minimum stress would be at the center of the beam, near the center line 74. The line 66 represents the stress distribution line for the beam.

From similar stress diagrams, a typical beam can be designed. By forming the flanges of the applicant's novel fastener continuously from end to end, there is available the continuous face 24 out of which to form a variety of prongs, spacings and positions for the prongs. This can be seen in FIG. 22 which would represent the top view taken along line 22—22 of the FIG. 20 beam 60. Because of the stress distributions shown in FIG. 21, it may be desirable to form approximately 56% of the fastener prongs 18 out of the end one-third of the beam shown by the number 76 since the maximum stress occurs in the area near the end bearing points 62 and 64.

In a like manner, since the stress drops off in the next one-third of the beam span it may be desirable to form approximately 33% of the prongs 18 in the area shown by the numeral 78. And finally, since the beam stress is relatively small in the next one-third of the beam near the beam center line 74, this area represented by the numeral 80 could have approximately 11% of the prongs formed in this area of light stress. The other half of the beam could then be formed in a like manner as long as the stress distribution was similar to that of FIG. 21.

Accordingly, because of the use of the continuous face 24 on the fastener flanges, the applicant's novel device can be designed with a large variety of prong spacings, sizes, etc. which then contributes to the overall variety of panel and beam stiffness and span lengths available when the fastener is attached to the penetrable plates such as plywood or the like. Depending on the stiffness of the joint between the penetrable plates such as 32 and/or 34 and the prongs 18 embedded therein, the deflection of the composite panel unit shown in FIGS. 7 or 8 may be reduced fivefold over similar non-composite panels, indicating a substantial improvement in stiffness.

As the panels shown in FIGS. 7 or 8 are deflected under a uniform service load, the nailable penetrable plates 32 and/or 34 are restrained from sliding horizontally across the top of the continuous flange surface 24 of the flanges 14 and/or 16 by the fastener prongs 18. As before mentioned, under normal loading conditions, maximum horizontal shearing stresses will occur at the panel supports such as at 42 in FIGS. 9 and 10 or at 62 and 64 as shown in FIG. 20. In addition, the minimum horizontal shearing stresses, as shown in FIG. 21, will occur at mid span of the beam.

Referring now to FIG. 23, there is shown a perspective view of a simple building showing how the applicant's novel fastener could be used in the building construction. The building, shown generally by the numeral 82 would be constructed with a plurality of steel channel frames 84, spaced apart in bays from 8' to 40' as shown by the numeral 94. Vertical steel columns 86 would be fixedly attached to the ends of the frames 84 and vertical center columns 88 may be positioned as shown. A composite structural unit of the configuration shown in FIG. 7, using the novel fastener 10 of FIG. 1, could then be formed at the job site as will be described hereinafter, and erected as shown to form the roof, sides and ends of the building with the penetrable plate (plywood, wafer board, etc.) 32 being exposed on the outside of the building 82.

Standard screw fasteners 90 would then hold the ends of the composite unit onto the steel channel frames 84 and the steel columns 86 and 88 after positioning the cut out ends 40 of the fastener on the frames and columns. A typical composite unit would be 4' wide as shown by the numeral 92 and would be formed of a length varying from 8' to 40'. Additional finishing materials may then be affixed to the penetrable plates 32 such as roofing and decorative siding as desired.

When a building is constructed thusly, the advantages of using these stressed-skin panels are many. Screw fasteners 90 are required only at the frames 84 and the columns 86 and 88 since the penetrable plates are held by the prongs formed on the novel fastener. This eliminates many man-hours of erection time using costly labor. The stressed-skin panels are stressed under loading conditions and they act to transfer those stresses from panel to panel making the structure resistant to shear. Another advantage is that the roof develops excellent diaphragm action.

Because of the unique construction of the applicant's device, the lightest weight panel is available based on the load-to-span ratio. This advantage makes it highly desirable in earthquake prone areas such as California since the energy that is imparted to a building by an earthquake is directly proportional to the weight of the building. In other words, light buildings mean light damage in an earthquake.

Further advantages of the novel construction would be in the use of a combination of wood and steel for the composite use. Wood is excellent when used in bending (compression) and steel is excellent when used in tension. The applicant's unique design combines both to achieve the strongest composite unit available based on load-to-span and also the most economical panel available.

The roof, wall, floor and end wall end wall panels can be identical and the door and window openings can be field cut or provided at a remote plant. The panels can qualify as a fire rated assembly when sheet rock with F. C. Gypboard is applied and the panels may be easily insulated and wired.

A final important advantage of the applicant's stressed-skin panel is that the panel bearing is on the panel and not on the sheet metal web, thereby reducing the roof and floor profiles and overall height of the building.

Turning now to FIGS. 24–26 of the drawings there is shown a further modified form of a fabricated structural beam shown generally by the numeral 96 which comprises an elongated continuous web 98 having an upper section 100 and a lower section 102. The upper section 100 is positioned above the neutral axis 104 of the beam 96 and has formed thereon a plurality of sharp fastener prongs 18 of the type similar to those shown in FIGS. 4–5. The prongs 18 would be turned outward in opposite directions as shown in FIG. 25 and would be used to fixedly attach a pair of penetrable plates in the form of wooden 2"×4" structures. The wooden 2"×4" pieces are numbered 106 and 108 and would be pressed onto the fastener prongs 18 as before described.

The fabricated structural beam 96 also has cut out end portions 110 on each end of the beam. These end portions form an end bearing surface 112 whenever the 2"×4" beams 106 and 108 are attached so that the ends of the structure can rest on a building surface 114. In forming the web 98 it may be desirable to form approximately 56% of the prongs along the end third of a half span shown by the numeral 120. In a like manner, it may be desirable to form approximately 33% of the prongs along the next third of a half span as shown by the numeral 122. The final third of the half span, shown by the numeral 124, next to the center line 125 of the span would probably contain approximately 11% of the fastener prongs. Other prong spacings may be desired depending upon the particular beam application and wishes of the beam designer.

It can be seen that the elongated web 98 forms a first longitudinal plane surface and the two wooden 2"×4" pieces form a second longitudinal plane surface when attached by the prongs perpendicular to the plane surface of the web 98. A penetrable plate such as a 4"×8" sheet of plywood or the like may then be nailed to the top surface 123 of the 2"×4" pieces thereby enabling this novel fabricated structural beam 96 to be used in a manner similar to the variations shown in FIGS. 11–18. By the use of the continuous web 98 with the fastener prongs 18, the beam designer is able to design a large variety of panel and beam stiffnesses as well as span lengths.

In designing and constructing the flitched beam 96 with the extended web 98, it would be desirable to stress the steel web 98 fifteen times that of the wooden 2"×4" pieces 106 and 108 while stressing the wood to its full allowable stress. This way the depth of the steel web 98 may be determined. A typical thickness of the web 98 would be 18 guage sheet metal when using 2"×4" attached pieces 106 and 108. Other thicknesses of the web 98 and sizes of the wooden pieces 106 and 108 may be utilized within the spirit and scope of the invention depending upon the length of beam needed and the various loads on the flitched beam 96. The flitched beam design may also be configured in other shapes thereby giving the beam designer much latitude when designing a large building project.

Referring now to the drawing FIGS. 27 and 28 there will be shown and described the applicant's novel method using his novel fastener to form a novel composite structure at a job site. The method of fastening construction materials to the novel fastener at a job site comprises first the step, shown at numeral 126 of FIG. 27, of providing a plurality of penetrable construction materials at the job site. These may be plywood sheets, wafer board sheets, wooden beams of various sizes and other materials. The next step, shown by the numeral 128 in FIG. 27, would be providing a plurality of structural members at the job site with the members being one of the type hereinbefore described which has at least one elongated web section and at least one perpendicular elongated continuous flange section. One of the sections would have formed thereon the plurality of sharp fastener prongs 18 as before described. The structural member can be manufactured at a remote plant by drawing sheet metal from coils past a die stamping machine which presses the prongs 18 from the strips. After being cut to the desired length, the sheets can be roll-formed or press braked to the required structural configuration.

The final step, shown by the numeral 130 in FIG. 27, would be to press together the penetrable construction materials with the structural fastener using the integral fastener prongs to hold the penetrable plate tightly to the fastener. This may be easily done at the job site as shown in diagram form in FIG. 28 which would represent one way. A pressure device 134 consisting of an upper pressure roller 136 and a lower pressure roller 138 would be used to press together the fastener such as 22, to the two penetrable plates 32 and 34 as the items are fed in the direction shown by the arrow 132 into the pressure device. Another type of pressure device may be a press brake which also could be used at the job site. In certain applications, the structural fastener 22 may be pre-tensioned before it is fixed to the penetrable plate or plates 32 and 34 in order to provide camber in the finished panel.

In summary there has been shown herein a new and novel fastener structure which may be used to form a composite building panel construction which has many novel applications. The novel fastener structure can be applied transversely or across the width of a plate between longitudinally placed fasteners to frame around roof or floor openings such as stairs, skylights, etc. similar to conventional wood construction methods. In commercical construction, the builder can use the applicant's novel structural fastener to substantially reduce construction costs on building whose structure is designed for a standard eight-foot plywood panel roof deck. In this case, the user should use long span stressed-skin panels that economically span between the primary beams (20' to 40') and eliminate the purlins which are required to support the shorter plywood panels. Elimination of a purlin system from a warehouse, factory, shopping center and the like can produce significant construction savings.

In residential construction, the builder can also use the novel structural fastener to construct building shells to replace "stick-built" structures such as modular homes, mobile homes, residences, and the like. In these cases, the user should construct shallow stressed-skin panels to span between beams and columns for maximum economy. The plywood surface provides a sheathing function and forms a surface on which finished roofing and siding materials may be nailed, while the metal flanges of the novel structural fastener provide a support for interior finishing materials such as gypsum board and wood paneling.

Because of the applicant's novel construction, the metal structural fastener of the invention is adaptable to many construction uses and structural shapes. For example a shape known as a hat channel, shown generally by the numeral 140 in FIG. 29, could be modified by forming the prongs 18 on the spaced apart top flanges 14 and 142. In this structural shape, a pair of spaced apart webs 12 and 144 are integrally formed on a lower flange 16 leaving a space 146 there-between.

In forming the basic configuration and the various modifications of the applicant's novel invention, it may be desirable to enhance the holding ability of the prongs 18 by coating them with cement, rosin or other known materials within the spirit and scope of the invention.

In new uses, the user of the applicant's novel fastener has a fastener which is incombustible, to replace wood members that are prohibited from being used in certain types of construction by building codes, and/or must be protected by some fire resistant material. In cases where a floor, roof or wall assembly is required to be noncombustible, fire-retardant plywood skins may be used as the penetrable plates with the novel structural fastener. The penetrable plates may also be formed of alternate materials such as plastics and inorganic materials in other applications and the penetrable plates may be made flexible so as to produce curvilinear surfaces. Greater gripping power of the fastener prongs may be obtained by varying the prong design and these variations are all within the spirit and scope of the applicant's invention.

While many variations of the applicant's basic concept have been shown and described herein, there may be others, all of which are within the spirit and scope of this invention. The applicant is not to be limited to the exact embodiments shown which have been given by way of illustration only.

Having shown and described my invention, I claim:

1. In a structural fastener/stiffener member having two oppositely positioned bearing point ends and a mid-point center of the member between the two opposite ends, with the space between being divided into three areas on each side of the midpoint center and with the areas being called the end one-third, the next one-third and the center one-third of the flange section, the fastener/stiffener member being designed for use with a separate penetrable plate which is fastened to the member and is rigidly held thereto by fastener/stiffener prongs with the member and the fastened penetrable plate forming a composite structural unit that may be used as a structural beam which rests on the bearing point ends and is capable of accepting increased downward forces that cause bending to occur in a beam, the improvement comprising:
   (a) the member being formed with at least one elongated web section and with at least one continuous elongated perpendicular flange section;
   (b) the flange section having formed thereon a predetermined total number of integral fastener/stiffener prongs protruding from the continuous flange section; and
   (c) over 50% of the total number of fastener/stiffener prongs in the flange section are formed near the two oppositely positioned bearing point ends in the end one-third of the continuous flange section closest to each bearing point end.

2. The improvement as defined in claim 1 wherein approximately 56% of the prongs are formed in the end one-third near the two oppositely positioned bearing point ends.

3. The improvement as defined in claim 1 wherein approximately 33% of the prongs are formed in the next one-third of the flange section.

4. The improvement as defined in claim 1 wherein approximately 11% of the prongs are formed in the center one-third of the flange section.

5. A composite structural beam having two oppositely positioned bearing point ends and a mid-point center of the beam between the two opposite ends, with the space between being divided into three areas on each side of the midpoint center and with the areas being called the end one-third, the next one-third and the center one-third of the flange section, the beam being used in buildings, the beam being capable of being assembled on the building site by unskilled workers and having improved load carrying capacity and beam stiffness which resists horizontal shearing stresses occurring from the individual structural members which form the composite beam, sliding in relation to each other whenever a bending force is applied to the beam, comprising:
   (a) a one-piece integrally formed structural member having at least one elongated web section and having at least one continuous elongated perpendicular flange section;
      (1) the flange section being formed along the web section and having formed thereon a predetermined total number of integral fastener/stiffener prongs protruding from the continuous flange section;
      (2) over 50% of the total number of fastener/stiffener prongs in the flange section are formed near the two oppositely positioned bearing point ends in the end one-third of the continuous flange section closest to each bearing point end; and
   (b) an elongated penetrable plate rigidly positioned against the flange section by the fastener/stiffener prongs and rigidly held thereto by the prongs so that the penetrable plate is not free to slide on the flange section whenever a load is applied to the beam, the composite structural beam thusly formed serving to resist normal horizontal shearing stresses that develop in the composite structural beam under loading conditions, the stiffening occurring by the restraint of the fastened penetrable plate from sliding across the flange section, the fastened and stiffened penetrable plate also functioning as an extended flange in the composite beam with the web section taking shear stresses and the fastened and stiffened penetrable plate taking mostly bending stresses on the beam as well as performing a sheathing function when erected in a building structure.

6. The composite structural beam as defined in claim 5 wherein approximately 56% of the prongs are formed in the end one-third near the two oppositely positioned bearing point ends.

7. The composite structural beam as defined in claim 6 wherein the elongated penetrable plate may be formed of at least one of the following:
   (a) wood
   (b) waferboard
   (c) plywood
   (d) wooden beam.

* * * * *